3,829,379
PROCESS FOR TREATING ALDEHYDES
Shinichi Ishida, Tokyo, Noboru Oshima, Yokohama, Kunio Kurita, Kawasaki, Isamu Suzuki, Yokohama, and Hidetoshi Ohno, Kamakura, Japan, assignors to Asahi Kasei Kogyo Kabushiki Kaisha
Filed Feb. 25, 1972, Ser. No. 229,326
Claims priority, application Japan, Feb. 27, 1971, 46/9,794, 46/9,795; May 18, 1971, 46/32,928
Int. Cl. C02c 1/40
U.S. Cl. 210—18  4 Claims

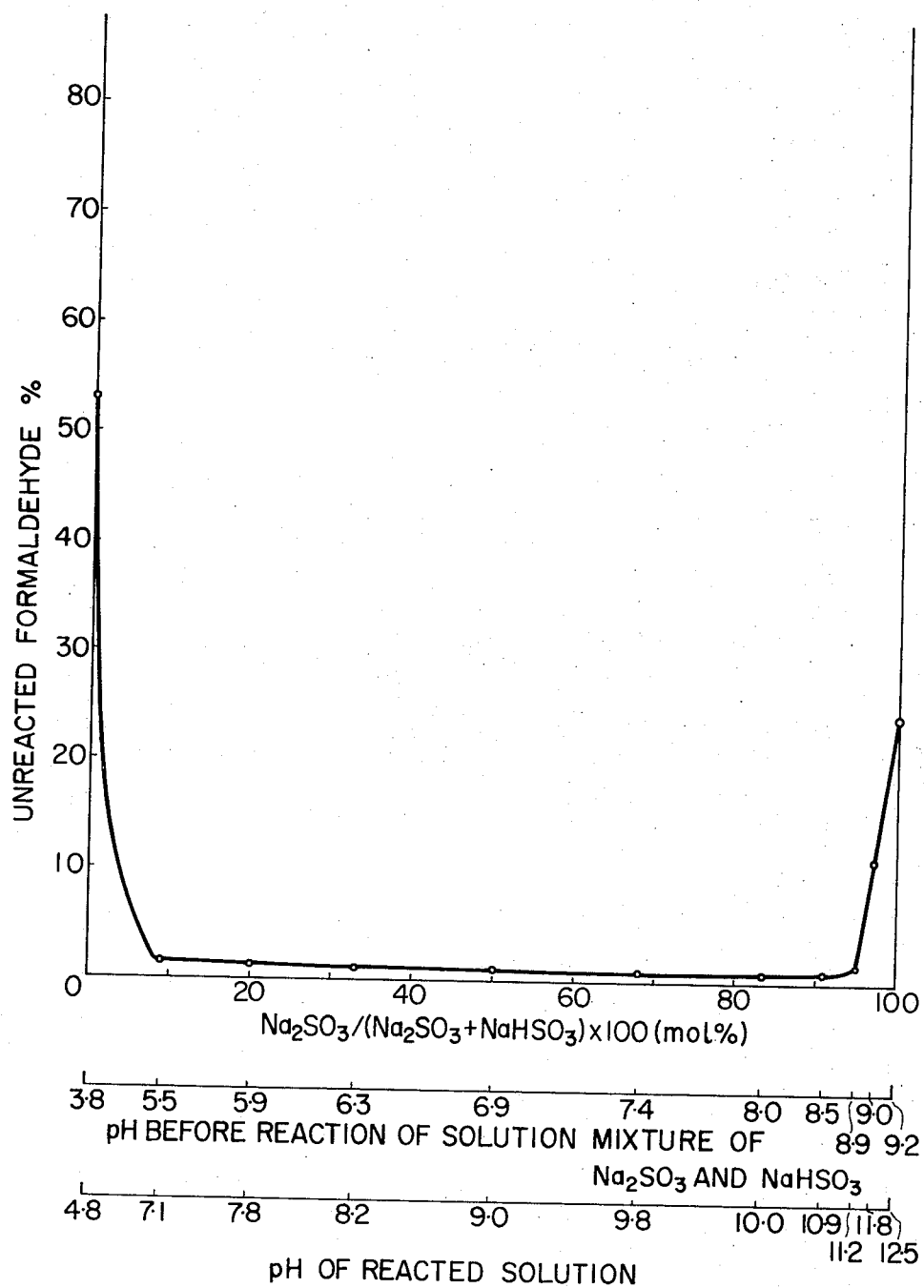

ABSTRACT OF THE DISCLOSURE

A gas or solution containing aldehydes such as formaldehyde, is contacted with a sulfite of alkali metals or ammonium or a mixture of 100 to 5% by weight of the sulfite and 0 to 95% by weight of bisulfite of alkali metals or ammonium, while keeping pH of a treating system at 6–11, and/or the resulting solution can be subjected to activated sludge treatment.

---

This invention relates to a process for treating a mixture containing aldehydes, and particularly to an improvement in a process for treating a gas or solution containing aldehydes such as formaldehyde with a sulfite or a mixture of sulfite and bisulfite.

Particularly, formaldehyde is widely utilized as a raw material for various synthetic resins such as polyacetal resin, urea resin, phenol resin, etc., and also as a raw material for preparing various chemicals or as an agent for treating and finishing fibers. However, formaldehyde is not thoroughly recovered or utilized in the process for producing formaldehyde as the raw material, or in the industries for utilizing the formaldehyde, and consequently the formaldehyde is usually discharged, in most cases, as a waste gas or as a dilute solution. The formaldehyde is a very toxic substance, and therefore it is necessary to pay a great attention to its disposal from the social-sanitary viewpoint or from the viewpoint of preventing the environmental pollution.

As to other aldehydes, for example, acetaldehyde is an important substance as a raw material for preparing acetic acid or peracetic acid, and acrolein is also an important substance as an intermediate material for preparing acrylic acid or as a raw material for preparing synthetic resins as such. Their toxicities are equivalent to that of formaldehyde, and therefore the same attention as for the formaldehyde must be also paid to the handling or disposal of these aldehydes.

Heretofore, water absorption, catalytic oxidation-decomposition based on the use of platinum catalyst, or ammonia absorption has been known as a method for treating a waste gas containing formaldehyde. The catalytic oxidation-decomposition method is based on decomposition of formaldehyde to harmless carbon dioxide and water and can be said as an ideal method for treating the formaledhyde, but is not always an economical method because of the use of the expensive catalyst or the use of auxiliary fuel for heating.

On the other hand, the water absorption method is generally used widely as a method for removing most of formaldehyde from the waste gas at a relatively low cost, but a large amount of water and a large scrubbing apparatus are necessry for completely removing the formaldehyde from the waste gas by water scrubbing from the viewpoint of vapor-liquid equilibrium of the aqueous formaldehyde solution, and the water absorption method is not always an advantageous method. Furthermore, a large amount of dilute formaldehyde solution by water scrubbing cannot be effluent from the viewpoint of environmental pollution. The ammonia absorption method also has various difficult problems in the disposal of by-products and residual ammonia.

As a result of detailed studies on removing and making harmless the aldehydes such as formaldehyde from the viewpoint of preventing the environmental pollution, the present inventors have found a very excellent and economical method for treating the aldehydes, and have accomplished the present invention.

It has been known that the aldehydes such as formaldehyde, etc. react with sulfites and bisulfites to form addition products, but an application of said reaction to the treatment of the aldehydes such as formaldehyde, etc. as such has not given a satisfactory result to the desired treatment so far. That is to say, the sulfites react with the aldehydes and alkali is produced as a by-product, and the reaction system turns to a strong basicity. As a result, the equilibrium of reaction is shifted towards the reactant side, and smooth reaction fails to proceed.

On the other hand, when the bisulfites are used, alkali is not produced as a by-product, but the progress of the reaction itself is retarded, and the generation of gaseous sulfur dioxide gas is observed, as described later. Therefore, the mere application of the reaction never meets the desired object intended by the present inventors.

As a result of detailed studies on a process for treating the aldehydes such as formaldehyde, etc. based on the use of sulfites and bisulfites as well as said facts, the present inventors have found a very excellent and economical method for treating the aldehydes.

That is to say, an object of the present invention is to provide a process for treating aldehydes effectively and economically, characterized by treating a mixture containing the aldehydes with a sulfite or a mixture of a sulfite and a bisulfite, while adjusting pH of a treating system to 6 to 11.

The aldehydes treated in the present invention include such saturated aliphatic aldehydes as formaldehyde, acetaldehyde, propionaldehydes, butyraldehydes, valeraldehydes, etc. and such unsaturated aliphatic aldehydes as acrolein, crotonaldehyde, etc. Above all, a gas or aqueous solution containing formaldehyde is usually treated in the present invention, but a mixture of at least two of said aldehydes can be also treated in the present invention. Furthermore, there is no limitation to the state or form of these aldehydes in the present invention. That is, any state or form of the aldehydes, a gas containing the aldehydes as a main component, an aldehyde gas diluted with other gas, an aqueous solution or a solution of organic solvent such as alcohol, etc. can be used in the present invention. Furthermore, a mixture of the aldehydes in any of said states or forms with other organic or inorganic substances such as formic acid, acetic acid, propionic acid, carbonic acid, methanol, hydrochloric acid, sulfuric acid, phenol, ammonia, etc. can be treated in the present invention without any failure of the object of the present invention.

The bisulfites and sulfites used in the present invention include alkali metal salts such as lithium, sodium and potassium salts, and ammonium salts, for example, sodium bisulfite, potassium bisulfite, lithium bisulfite, ammonium bisulfite, sodium sulfite, potassium sulfite, lithium sulfite, ammonium sulfite, etc.

The ratio of sulfite to bisulfite depends upon the type of treatment, for example, batch system or continuous system, concentration of by-product salts such as sodium metahydroxysulfonate, etc., a ratio of sulfite or a mixture of sulfite and bisulfite to the aldehydes to be treated, etc., but usually 0–95% by weight of the bisulfite can be used on the basis of the sulfite.

Recently, an absorption method based on an alkali (hydroxide) is widely used for treating sulfur dioxide contained in the waste flue gas, and at that time bisulfites are discharged in an excess alkali (hydroxide) state. By the reaction of the acid sulfite with excess alkali (hydroxide), sulfite is necessarily formed, and produced as a mixture of the acid sulfite and the sulfite. The resulting by-product mixture can be used in the present invention with a great economical advantage.

These bisulfite and sulfite can be used in any state or form in the present invention. For example, when the aldehydes to be treated are in an aqueous solution, solid salts as such can be used, but these salts can be usually used as an aqueous solution having a proper concentration or as a suspension of an organic medium.

By the use of a mixture of the sulfite and the bisulfite, treating efficiencies, for example, treating rate and treating effect, can be considerably improved, as compared with that attained when these salts are used singly, as described later. Further, by adjusting the pH of the treating system to a range of 6 to 11, the treating efficiency is further improved, and also a very great effect can be attained from the social-sanitary viewpoint as well as from the viewpoint of preventing waste water and air pollution, as described later.

As a pH-controlling agent used in the present invention, any of the ordinary acid substances and base substances can be used. As the acid substance, such mineral acids as bisulfites, hydrochloric acid, sulfuric acid, phosphoric acid, nitric acid, etc., such organic carboxylic acids as formic acid, acetic acid, butyric acid, etc., and such phenols as phenol, cresol, etc. can be used. On the other hand, as the base material, such inorganic bases as sulfites, caustic soda, caustic potassium, calcium hydroxide, ammonia, etc., and such organic bases as ethylamine, butylamine, pyridine, etc. can be used. These substances can be used singly or in a mixture of at least two. Since the principal object of the invention is to treat waste aldehydes, other inorganic or organic acid or base substances than those mentioned above, for example, some industrial waste, can be used in the present invention.

The present invention is carried out in various modes, depending the state or form of the mixture containing the aldehydes to be treated. That is to say, when the mixture containing the aldehydes is supplied in a gaseous state, the present invention is carried out by contacting the gaseous mixture containing the aldehyde with an aqueous solution of sulfite or a mixture of sulfite and bisulfite. For example, the use of a counter-current scrubbing method based on a packed column or bubble cap plate column, where the gas is led to the column from the bottom to contact the aqueous solution of the sulfite or the mixture of sulfite and bisulfite, which flows down in the column, is a preferable mode of the embodiment. At that time, the object of the present invention can be completely attained by adjusting the pH of the treating solution so that the solution may be discharged at a pH of 6–11 from the bottom of the column.

Further, when the mixture containing the aldehydes is supplied as a solution, the ordinary liquid phase mixing reaction system, for example, a tank reactor or a pipe reactor can be used.

The ratio of the sulfite or the mixture of the sulfite and bisulfite to the aldehyde to be treated is at least one mole in total of the sulfite and bisulfite to one mole of the aldehyde.

The mode of carrying out the present invention must be determined from the technical level of the users in view of the concentration of the aldehydes to be supplied, the mixing ratio of the bisulfite to the sulfite, the concentration of the salt mixture and the efficiency of the treating apparatus.

Preferable treating temperature used in the present invention is 20° to 70° C. in view of the reaction rate, concentration of the aldehydes in the waste gas and the concentration of the residual sulfur dioxide gas.

Figure shows experimental data for the present invention, where relations among the mixing ratios of the salt, pH of the reaction system and the conversion of formaldehyde are plotted when an aqueous formaldehyde solution is reacted with an aqueous solution of a mixture of sodium sulfite and sodium bisulfite.

As is clear from Figure, it is seen that the reaction proceeds very smoothly when the pH is in a range of 6 to 11.

For example, when a waste gas containing formaldehyde is scrubbed with the aqueous solution counter-current method while making up a portion of the circulating aqueous scrubbing solution, the following result can be obtained.

When formaldehyde is contacted with an aqueous solution of sodium sulfite, absorption is carried out smoothly at first, but the absorption is almost discontinued soon. That is to say, unabsorbed (unreacted) formaldehyde is discharged from the treating system, and finally 43% of the introduced formaldehyde is discharged from the system.

When the formaldehyde is contacted with an aqueous solution of sodium bisulfite under the same condition, unreacted formaldehyde is discharged from the beginning, and 63% of the introduced formaldehyde is discharged from the system. Further, in that case, the sulfur dioxide concentration of the effluent gas amounts to 20 p.p.m., and therefore a further treatment is necessary when the effluent gas is discharged to the atmosphere. Thus, this is not economically very advantageous.

On the other hand, when the formaldehyde is contacted, for example, with an aqueous solution of a mixture of sodium sulfite and sodium bisulfite having a mixing ratio of the former to the latter of 1.00:0.20 by mole (the initial pH of the aqueous solution being 8.0) under the same condition, more than 75% of the introduced formaldehyde is absorbed, and the sulfur dioxide concentration of the effluent gas is 0.002 p.p.m. or less. In that case, when the absorbing column is kept to preferable conditions and the concentration of formaldehyde discharged is repressed to low level to be necessary, the effluent gas can be discharged to the atmosphere without any treatment.

As shown in the foregoing simple facts, absorption efficiency of the mixture of the salts is excellent.

When the formaldehyde is reacted with and absorbed in the aqueous solution of sodium sulfite, pH is increased to 12.5, and the reaction is never completed. However, when an acid, for example, sulfuric acid, is added thereto to lower the pH below 11, the reaction can proceed again and can be completed.

That is, the pH is an important factor for carrying out the present invention, and it is necessary to adjust the pH with said acid substance or bisulfites as mentioned above.

To the contrary, in the case of sodium bisulfite, the pH is lower with the progress of the reaction, and therefore it is necessary to adjust pH with sodium sulfite or the base substances as mentioned above.

Quantitative relation of the pH adjustment depends upon the mixture containing the aldehydes to be absorbed itself, and the pH of the absorbing solution itself, and thus must be determined by the mode of practice.

As one of the effects of the present invention, prevention of sulfur dioxide gas generation can be mentioned. The bisulfite is generally considered as a relatively unstable substance, and, for example, sodium bisulfite undergoes slight decomposition according to the following formula, resulting in generation of sulfur dioxide gas, and its aqueous solution exhibits an acidity.

$$2NaHSO_3 \rightarrow Na_2SO_3 + SO_2 + H_2O$$

That is to say, when only the bisulfite is used to treat the aldehydes such as formaldehyde, sulfur dioxide gas is generated at the same time, even though these aldehydes can be treated to some extent. This is not preferable from the viewpoint of the prevention of environmental pollution. On the other hand, by using the sulfite at the same time together with the bisulfite and also adjusting the pH to 6–11 as in the present invention, the generation of sulfur dioxide gas can be completely repressed.

As another effect of the present invention, an economy in the material of the treating apparatus can be mentioned.

As mentioned above, the aqueous solution of the bisulfite exhibits an acidity, and also the treating solution resulting from the reaction thereof with the aldehydes such as formaldehyde exhibits an acidity. Therefore, there is a great restriction to the materials for the treating apparatus, and there is an unavoidable economic disadvantage. On the other hand, by using the sulfite together with the bisulfite and adjusting the pH to 6–11 according to the present invention, said disadvantage can be eliminated.

It is observed that the toxicity of the solution treated according to the present invention is considerably lowered. Further, by treating the solution by activated sludge, the solution can be made almost completely harmless. As compared with the direct activated sludge treatment of a formaldehyde solution without any treatment of the present invention, lowering of COD (chemical oxygen demand) is considerably enhanced, when the solution resulting from said treatment of the present invention is treated with the activated sludge, and also it is observed that the capable BOD (biological oxygen demand) load of the sludge is larger and the activity of the activated sludge is never deteriorated. That is, the activated sludge treatment of waste aqueous solution can be very efficiently carried out in the present invention.

The well-known activated sludge treatment can be available in the present invention. That is to say, the object of the present invention can be readily attained by adding nitrogen and phosphorus compounds such as urea, ammonium nitrate, ammonium sulfate, sodium nitrate, peptone, calcium hydrogen phosphate, sodium hydrogen phosphate, etc. as a nutrient for sludge to the treating solution resulting from the treatment of a mixture containing the aldehydes with a sulfite or a mixture of the sulfite and bisulfite in a pH range of 6 to 11, and carrying out the activated sludge treatment of the solution in an aeration tank according to the ordinary procedure.

For example, when an aqueous solution containing 900 p.p.m. of formaldehyde, 60 p.p.m. of formic acid and 80 p.p.m. of methanol (whose COD and BOD are 1,430 p.p.m. and 1,560 p.p.m., respectively) is directly subjected to activated sludge treatment, the COD and BOD are 270 p.p.m. and 80 p.p.m., respectively, after the treatment. Further, a considerable decrease in the activity of the sludge is observed. On the other hand, when the same aqueous formaldehyde solution is treated with the present mixture of sodium sulfite and sodium bisulfite, and then subjected to the activated sludge treatment in the same manner as above, the COD and BOD were greatly reduced to 17 p.p.m. and 3 p.p.m. after the treatment, and the decrease in the activity of the sludge is not observed at all.

It is seen from the foregoing fact that a combination of the treatment of a mixture containing the aldehydes with the sulfite or a mixture of the sulfite and bisulfite of the present invention in advance and the successive activated sludge treatment has a better effect than the direct activated sludge treatment of the mixture containing the aldehydes.

Example 1

500 cc. (0.5 mole) of an aqueous 1 M sodium sulfite solution was charged in a 1-l. glass beaker provided with a stirrer and a pH electrode, and 100 g. (0.40 mole) of an aqueous solution containing 11.9% by weight of formaldehyde was added thereto with stirring. The temperature of the reaction solution was almost instantaneously increased from 22° C. which is a temperature before the reaction to 25° C., and was thereafter kept constant. The pH of the solution was changed from 9.2 which is a value before the reaction to 12.5, and kept almost constant thereafter. After the stirring for 10 minutes, a portion of the reaction solution was sampled, and the amount of unreacted formaldehyde was quantitatively determined by gas chromatography.

Then, at the same time when the aqueous formaldehyde solution was added thereto dropwise, sulfuric acid was added thereto to adjust the pH of the reaction solution, while the reaction was carried out. After 10 minutes from the start of reaction, the amount of unreacted formaldehyde was likewise quantitatively determined. The results are given in Table 1.

TABLE 1

| Run No. | pH of reaction solution | Conversion of formaldehyde (10 minutes after the start of reaction) |
|---|---|---|
| 1 | 12.5 (no addition of sulfuric acid) | 76.0 |
| 2 | 11.4 (addition of sulfuric acid) | 87.2 |
| 3 | 10.0 (addition of sulfuric acid) | 97.6 |
| 4 | 9.2 (addition of sulfuric acid) | 97.7 |
| 5 | 7.3 (addition of sulfuric acid) | 98.2 |
| 6 | 6.1 (addition of sulfuric acid) | 96.9 |
| 7 | 4.2 (addition of sulfuric acid) | 72.5 |

Example 2

500 ml. (0.5 mole of $Na_2SO_3$) of an aqueous 1 M sodium sulfite solution was charged to a 1-l glass beaker provided with a stirrer and a pH electrode, and 100 g. (0.397 mole of $CH_2O$) containing 11.9% by weight of formaldehyde was added thereto with stirring.

Then, 500 ml. of aqueous solutions of sodium sulfite and sodium bisulfite mixed in various ratios (concentration: 1 M) ($Na_2SO_3 + NaHSO_3 = 0.5$ mole) were charged to the same vessels, and 100 g. (0.397 mole of $CH_2O$) of an aqueous solution containing 11.9% by weight of formaldehyde was added thereto with stirring. Total 9 kinds of the solution mixtures of sodium sulfite and sodium bisulfite were prepared. That is, the following ratios, 0.03 part, 0.05 part, 0.10 part, 0.20 part, 0.50 part, 1.00 part, 2.00 parts, 4.00 parts and 10.0 parts of sodium bisulfite to one part of sodium sulfite were used, respectively. The ratios are by molar ratio of sodium sulfite to sodium bisulfite.

Temperatures before and after the reaction of the aqueous solution of sodium sulfite or a mixture of sodium sulfite and sodium bisulfite, pH of the solution, and the result of determination of the amount of unreacted formaldehyde in the solution after 10 minutes of the reaction are given in Table 2.

The result of the same test carried out for the aqueous solution of sodium bisulfite is shown therein as a comparative example.

TABLE 2

| Test Run No.: | Na₂SO₃/(Na₂SO₃+NaHSO₃)×100 (mole) (Na₂SO₃/NaHSO₃ by mole) | Temp. before reaction (°C.) | Temp. after reaction (°C.) | pH before reaction (solution mixture of Na₂SO₃+NaHSO₃) | pH after reaction (reaction solution) | Unreacted formaldehyde after 10 min. of reaction (percent) |
|---|---|---|---|---|---|---|
| 1 | 100 (1.00/0) | 22 | 25 | 9.2 | 12.5 | 24 |
| 2 | 97 (1.00/0.03) | 20 | 26 | 9.0 | 11.9 | 11 |
| 3 | 95 (1.00/0.05) | 20 | 26 | 8.9 | 11.2 | 1.5 |
| 4 | 91 (1.00/0.10) | 20 | 27 | 8.5 | 10.9 | 0.9 |
| 5 | 83 (1.00/0.20) | 20 | 27 | 8.0 | 10.0 | 0.8 |
| 6 | 67 (1.00/0.50) | 20 | 26 | 7.4 | 9.8 | 0.9 |
| 7 | 50 (1.00/1.00) | 20 | 26 | 6.9 | 9.0 | 1.0 |
| 8 | 33 (1.00/2.00) | 20 | 26 | 6.3 | 8.2 | 1.2 |
| 9 | 20 (1.00/4.00) | 20 | 25 | 5.9 | 7.8 | 1.3 |
| 10 | 9.1 (1.00/10.00) | 20 | 23 | 5.5 | 7.1 | 1.5 |
| Comp. example | 0 (0/1.00) | 22 | 24 | 3.8 | 4.8 | 53 |

Examples 3–8

Formaldehyde gas was scrubbed countercurrent-wise according to the present process, using a stainless steel jacketed column having an inner diameter of 5 cm., height of 1.9 m. and Raschig rings having a size of 5 x 5 mm. being packed.

A nitrogen gas containing 1,200 p.p.m. of formaldhyde was blown at 60° C. into the column from the bottom thereof at a rate of 20 l./min. An aqueous solution mixture containing 0.009 moles of sodium sulfite and sodium bisulfite adjusted to a constant pH by changing the mixing ratio of sodium sulfite to sodium bisulfite as shown in Table 3 was continuously supplied to the column from the top thereof at a rate of 100 ml./min. to react with the formaldehyde within the column. The reaction solution was used by recycle, and a portion of the solution was withdrawn from the bottom of the column and led to a storage tank.

As a comparative test, water was used by recycle under the same conditions in place of the aqueous solution mixture of sodium sulfite and sodium bisulfite.

In any run, the formaldehyde in the effluent gas leaving the top of the column is determined by gas chromatography or absorbed in water and determined by a colorimetric method (acetylacetone method). Sulfur dioxide contained in the effluent gas leaving the top of the column was absorbed in an aqueous solution of mercuric chloride and then determined by a colorimetric method (formalin-p-Rosaniline method).

The results are given in Table 3.

subjected to toxic test. Red killifishes, which passed for 30 days after the purchase and grew smoothly, were kept in thermostat vessels filled with said test solutions at a temperature of 22°±2° C., and survival percentage after 24, 48 and 72 hours was determined. The result is shown in Table 4.

TABLE 4

| Ex. No. | Test solution | Survival percentage of red killifishes (percent) | | |
|---|---|---|---|---|
| | | 24 hrs. | 48 hrs. | 72 hrs. |
| 9 | Reaction solution obtained in Ex. 5 was diluted to 2-fold vol. with water. | 100 | 100 | 100 |
| 10 | Reaction solution obtained in Ex. 6 was diluted to 2-fold vol. with water. | 100 | 100 | 100 |
| 11 | Reaction solution obtained in Comp. Ex. was diluted to 2-fold vol. | 0 | 0 | 0 |

Examples 12–15

A gas containing 1,800 p.p.m. of formaldehyde, 400 p.p.m. of formic acid and 200 p.p.m. of methanol at 70° C. was blown in at the bottom of the same apparatus as used in Examples 3 to 8 at a rate of 20 l./min. From the top of the column, an aqueous 0.013 M sodium bisulfite solution was supplied at a rate of 100 cc./min. to effect countercurrent scrubbing of the gas. The pH of the reaction solution withdrawn from the bottom of the column was 9.0, and about 10 p.p.m. of formaldehyde was detected in the effluent gas leaving the top of column.

Then, a solution mixture of sodium sulfite and sodium bisulfite was supplied from the top of the column in place

TABLE 3

| Ex. No.: | pH of aqueous solution mixture of sodium sulfite and sodium bisulfite supplied from the top of column | pH of the reaction solution withdrawn from the bottom of the column | Formaldehyde concentration of the gas blown into the bottom of the column (p.p.m.) | Formaldehyde concentration of the gas leaving the top of the column (p.p.m.) | Sulfur dioxide concentration of the gas leaving the top of the column |
|---|---|---|---|---|---|
| 3 | 8.9 | 9.2 | 1,210–1,280 | 8–12 | 0.02–0.04 |
| 4 | 7.9 | 8.3 | 1,210–1,280 | 2–3 | 0.08–0.09 |
| 5 | 7.0 | 7.2 | 1,250–1,270 | 0.3–0.5 | 0.11–0.13 |
| 6 | 6.2 | 6.3 | 1,250–1,270 | 0.2–0.4 | 0.57–0.71 |
| 7 | 5.3 | 5.5 | 1,220–1,250 | 0.4–0.6 | 2.3–3.1 |
| 8 | 4.7 | 4.9 | 1,220–1,250 | 0.4–0.7 | 21–35 |
| Comp. ex. | (¹) | 5.8 | 1,190–1,230 | 22–28 | |

¹ Water at pH 5.8.

Examples 9–11

The reaction solutions withdrawn from the bottom of the column in Examples 5 and 6 and Comparative Example were diluted to half concentration with water, and of said scrubbing solution, and the pH of the solution was adjusted to 6 to 9. The countercurrent scrubbing of gas was carried out under the same conditions. The result is shown in Table 5.

TABLE 5

| Ex. No. | pH of the solution mixture supplied into the top of column | pH of the reaction solution withdrawn from the bottom of the column | Formaldehyde concentration of the gas blown into the bottom of the column (p.p.m.) | Formaldehyde concentration of the gas leaving the top of the column (p.p.m.) | Formic acid and methanol concentrations of the gas leaving the top of the column (p.p.m.) | Sulfur dioxide concentration of the gas leaving the top of the column (p.p.m.) |
|---|---|---|---|---|---|---|
| 12 | 8.9 | 9.0 | 1,650–1,750 | 10 | Formic acid: 0, methanol: 0.2 | 0.02–0.04 |
| 13 | 8.0 | 8.2 | 1,750–1,800 | 2–3 | do | 0.08–0.09 |
| 14 | 6.9 | 7.3 | 1,750–1,800 | 0.3–0.5 | do | 0.11–0.13 |
| 15 | 6.1 | 6.3 | 1,820–1,850 | 0.2–0.4 | do | 0.57–0.71 |

Examples 16–20

A gas containing 3.2% formaldehyde, 1% acetaldehyde, 0.63% propionaldehyde, 0.96% acrolein and 0.19% acrylic acid was scrubbed countercurrent-wise with various scrubbing solutions as shown in Table 6 in the same apparatus as used in Examples 2–6, and the effluent gas was analyzed by a gas chromatographic apparatus provided with highly-sensitive TCD FID. As a result, it was found that the aldehydes and acrylic acid were absorbed in these scrubbing solutions. No aldehyde was detected by smell sense test, but when water and an aqueous 3% ammonia solution were used as the scrubbing solution as comparative tests, aldehyde smell and ammonia smell (when the aqueous ammonia solution was used) were detected in the effluent reaction solution and the effluent gas. The tests were all carried out in a ratio of the amount of the descending scrubbing solution to the amount of the gas passed through the column ($L/G$) of 10, at 40° C. The results are shown in Table 6. In Examples 14 to 18, the pH of the scrubbing solution was kept to 6–9 with sulfuric acid or sodium hydroxide.

drawn in an amount corresponding to the amount of the solution mixture supplied, from the circulating solution tank by a metering pump. The circulating solution was introduced to the scrubbing column by a metering pump so that the liquid-gas ratios in the scrubbing column might be 7 and 10, respectively. The temperature of the solution within the column was kept to 50° C. The result of the countercurrent-wise scrubbing of the nitrogen gas containing the formaldehyde is shown in Table 7. The sulfite used in these Examples was sodium sulfite, and the bisulfite was sodium bisulfite.

TABLE 7

| Ex. No. | Formaldehyde concentration of the nitrogen gas (p.p.m.) | $L/G$ | Mixing ratio of sulfite and bisulfite | pH of the solution at the top of the column | pH of the solution at the bottom of the column | Formaldehyde concentration of the effluent gas (p.p.m.) | Sulfur dioxide concentration of the effluent gas (p.p.m.) |
|---|---|---|---|---|---|---|---|
| 21 | 1,190 | 7 | 95/5 | 8.80 | 8.93 | 10.3 | 0.002 |
| 22 | 1,230 | 10 | 95/5 | 8.80 | 8.90 | 7.5 | 0.002 |
| 23 | 1,150 | 7 | 90/10 | 8.25 | 8.37 | 9.2 | 0.005 |
| 24 | 1,100 | 10 | 90/10 | 8.25 | 8.36 | 4.7 | 0.005 |
| 25 | 1,210 | 7 | 80/20 | 7.20 | 7.33 | 6.3 | 0.007 |
| 26 | 1,200 | 10 | 80/20 | 7.20 | 7.32 | 3.8 | 0.007 |
| 27 | 1,220 | 7 | 100/0 | 9.30 | 9.37 | 9.9 | 0.001 |
| 28 | 1,180 | 10 | 100/0 | 9.30 | 9.33 | 8.0 | 0.001 |
| 29 | 1,190 | 7 | 50/50 | 6.33 | 6.47 | 6.2 | 0.010 |
| 30 | 1,200 | 10 | 50/50 | 6.33 | 6.45 | 4.1 | 0.010 |

Example 31

60 l. of an aqueous solution containing 900 p.p.m. of formaldehyde, 60 p.p.m. of formic acid and 80 p.p.m. of methanol was admixed with 240 g. of sodium sulfite and well stirred. The thus treated solution showed an alkalinity, and thus hydrochloric acid was added thereto to adjust pH to 5.1. The resulting solution and the untreated raw solution were subjected to activated sludge treatment, respectively. The conditions for activated sludge treatment are given below:

Urea and potassium hydrogen phosphate were added to these sample solutions at a rate of BOD/N/P = 108/7/2,

TABLE 6

| Ex. No.: | Scrubbing solution (concentration percent) | Effluent gas analysis | Smell sense test of the scrubbing solution after absorption |
|---|---|---|---|
| 16 | Sodium sulfite (5) | Formaldehyde, acetaldehyde, $CH_3CH_2CHO$, $CH_2=CHCHO$, and $CH_2=CHCOOH$ were not detected. | No aldehyde smell. |
| 17 | Potassium sulfite (5) | do | Do. |
| 18 | Ammonium sulfite (5) | do | Do. |
| 19 | Sodium bisulfite (5) | do | Do. |
| 20 | Ammonium bisulfite (5) | do | Do. |
| Comp. test | Water | $CH_2O$, $CH_3CHO$, $CH_3CH_2CHO$, $CH_2=CHCHO$ and $CH_2=CHCOOH$ were detected. | Strong aldehyde smell. |
|  | Ammonia water (3) | $CH_2O$, $CH_3CHO$, $CH_3CH_2CHO$, $CH_2=CHCHO$, $CH_2=CHCOOH$ and $NH_3$ were detected. | Ammonia and other disagreeable smells. |

NOTE.—Scrubbing column: column diameter: 5 cm., column height: 1.9 m. packed with Raschig rings.

Examples 21–30

A nitrogen gas containing formaldehyde was scrubbed countercurrent-wise according to the present invention in a counter-current scrubbing apparatus consisting of a stainless steel column having an inner diameter of 5 cm., a height of 1.9 m. and a jacket, the column being packed with Raschig rings having size of 5 x 5 mm., a circulating solution tank, a circulating pump, a tank for a solution mixture of sulfite and bisulfite, a transfer pump and a pump for withdrawing the circulating solution. A distribution plate for the circulating solution was provided at the top of the column for preventing the channeling. The concentration of the solution mixture of sulfite and bisulfite was kept constant at 0.04 mol/l., and the solution mixtures corresponding to 1.1 and 2.0 parts by mole per 1.0 part by mole of the formaldehyde in the nitrogen led to the absorption column were supplied after mixing with the circulating solution just before the top of the column by a metering pump. The circulating solution was withdrawn in an amount corresponding to the amount of the solution mixture supplied, from the circulating solution tank by a metering pump. The circulating solution was and then the solutions were led to an aeration tank and further to a treating tank, where they were treated at a BOD volume load of 2.5 kg./m.³/day, MLSS load of 0.42 kg., BOD/kg. MLSS/day.

The measurements of COD and BOD of the sample solutions before or after the treatment was carried out according to Japanese Industrial Standard JIS KO102–13 and JIS KO122–16, respectively.

The results are shown in Table 8. The analytical values of the solutions treated with the activated sludge were mean analytical values of the solutions treated continuously for 7 days and sampled once in a day. In the case of sample solution treated according to the present invention, no decrease in the activity of the sludge was observed, but the decrease in the activity was observed in the case of the untreated raw solution.

TABLE 8

| | Before the treatment with the activated sludge | | | | After the treatment with the activated sludge | | | | Treatment efficiency | |
|---|---|---|---|---|---|---|---|---|---|---|
| | Formaldehyde smell (heated to 80° C.) | pH | COD (p.p.m.) | BOD (p.p.m.) | Formaldehyde smell (heated to 80° C.) | pH | COD (p.p.m.) | BOD (p.p.m.) | COD (percent) | BOD (percent) |
| Untreated raw solution | Observed | 6.5 | 1,430 | 1,560 | Observed | 6.9 | 270 | 80 | 81.2 | 94.9 |
| Treated solution | None | 5.1 | 950 | 1,050 | None | 6.9 | 17 | 3 | 98.2 | 99.7 |

Example 32

A nitrogen gas containing 3.4% formaldehyde and 5.1% formic acid was passed through a gas scrubber column having a column diameter of 2.5 cm. and a Raschig ring-packed height of 1.5 m. at 70° C. When only water was used as a scrubbing liquid, unabsorbed formaldehyde concentration of the nitrogen gas leaving the column was still 0.04%, even if $L/G$ was made as large as possible for the column, that is, about 20, and considerable smell was detected in the effluent gas.

However, when an aqueous 5% sodium sulfite solution was used as the scrubbing solution, a very small amount of formaldehyde, for example, the amount which was quantitatively undeterminable by the gas chromatography, was observed in the effluent gas in a ratio $L/G<20$, and no irritating smell was detected. Further, the recycle use of the scrubbing solution was possible by making up a little excessive amount of sodium sulfite over the formaldehyde. The result is shown in Table 9.

TABLE 9

| Scrubbing solution | L/G | Formaldehyde concentration of the effluent gas (p.p.m.) | pH of the scrubbing solution after the absorption | Formic acid concentration of the scrubbing solution after the absorption (percent) |
|---|---|---|---|---|
| Water | 5 | 2,100 | 2.2 | 0.84 |
| | 10 | 900 | 2.4 | 0.45 |
| | 20 | 400 | 2.6 | 0.23 |
| Aqueous 5% sodium sulfite solution | 5 | 0.3 | 9.5 | 0 |
| | 10 | ¹0.1 | 8.1 | 0 |
| | 20 | ¹0.1 | 7.6 | 0 |

¹ Or less

Examples 33–36

A nitrogen gas containing 2.5% formaldehyde, 1.1% acetaldehyde and 0.3% propionaldehyde and also containing butane was scrubbed countercurrent-wise by scrubbing solutions as shown in Table 10, and the effluent gas was analyzed by gas chromatography. It was found that the aldehydes could be absorbed by these scrubbing solutions. These scrubbing solutions showed a minus result in the smell sense test carried out by heating the solutions at 40° C. In the cases that the scrubbing solutions were water and the aqueous 3% ammonia solution, respectively, the aldehyde smell was detected in the former case, and the aldehyde and ammonia smells were detected in the latter case. The result is shown in Table 10.

Scrubbing conditions: Scrubbing column: column diameter 2.5 cm., column height 1 m., packed part 75 cm. Temperature: scrubbing solution 30° C., $L/G=12$
pH of the scrubbing solutions in Examples 33–36 was kept to 6–10 with sulfuric acid or caustic soda.

TABLE 10

| Ex. No.: | Scrubbing solution (concentration percent) | Effluent gas analysis | Sense test of the scrubbing solution after the absorption |
|---|---|---|---|
| 33 | Potassium sulfite (10) | Only butane was detected | No irritating smell. |
| 34 | Sodium bisulfite (10) | do | Do. |
| 35 | Ammonium sulfite (10) | do | Do. |
| 36 | Ammonium bisulfite (10) | do | Do. |
| Ref. example | Water | Propionaldehyde, acetaldehyde, formaldehyde and butane were detected. | Aldehyde smell and butane smell were detected. |
| | Ammonia water (10) | Propionaldehyde, acetaldehyde, formaldehyde, butane and ammonia detected | Ammonia smell and other complicated disagreeable smells. |

Example 37

1,020 g. of sodium sulfite was added to 60 l. of an aqueous solution containing 3,800 p.p.m. of formaldehyde and 1,200 p.p.m. of phenol, and then dilute sulfuric acid was added thereto to adjust pH to 6.8. The resulting solution was diluted to 5-fold with water, and subjected to activated sludge treatment under the same conditions as in Example 31. Purified water having pH 7.3, COD 20 p.p.m. and BOD 5 was thereby obtained.

We claim:
1. A process for treating a solution containing aldehyde, which comprises contacting a solution containing aldehyde with a sulfite or a mixture of a sulfite and a bisulfite, while keeping the pH of the treating system at 6–11, and subjecting the resulting solution to activated sludge treatment, the sulfite and bisulfite being selected from those of alkali metals and ammonium.
2. A process according to Claim 1, wherein 0 to 95% by weight of the bisulfite is contained in said mixture, on the basis of the sulfite.
3. A process according to Claim 1, wherein the aldehyde is selected from the group consisting of formaldehyde, acetaldehyde, propionaldehydes, butyraldehydes, valeraldehydes, acrolein and crotonaldehyde.
4. A process according to Claim 1, wherein the aldehyde is formaldehyde.

References Cited

UNITED STATES PATENTS 3,660,278    5/1972    Mimura et al. _____ 210—11

OTHER REFERENCES

Chem. Abstracts, 1961, 27045g.

SAMIH N. ZAHARNA, Primary Examiner
T. G. WYSE, Assistant Examiner

U.S. Cl. X.R.
210—59